United States Patent [19]
Kobayashi et al.

[11] Patent Number: 5,276,673
[45] Date of Patent: Jan. 4, 1994

[54] READ-ONLY OPTICAL DISK CONTAINING A REFLECTIVE LAYER COMPRISING AN AL ALLOY CONTAINING TA

[75] Inventors: Yoshimitsu Kobayashi, Tokyo; Yoshiyuki Kisaka, Kurashiki; Takashi Hashimoto, Sagamihara; Toshifumi Kawano, Yokohama; Mitsugu Wakabayashi, Kurashiki, all of Japan

[73] Assignee: Mitsubishi Kasei Corporation, Tokyo, Japan

[21] Appl. No.: 524,078

[22] Filed: May 16, 1990

[30] Foreign Application Priority Data

May 18, 1989 [JP] Japan .................. 1-125053

[51] Int. Cl.$^5$ ............ G11B 7/24; G11B 7/00
[52] U.S. Cl. .................. 369/275.3; 369/288; 430/945
[58] Field of Search ................. 369/275.1–; 430/945, 495; 346/135.1

[56] References Cited

U.S. PATENT DOCUMENTS 5,013,594  5/1991  Mizumura et al. ............. 369/284
5,155,723  10/1992 Hamada et al. ............... 369/284
5,215,799  6/1993  Sakoda et al. ................. 428/64

FOREIGN PATENT DOCUMENTS 56-61048  5/1981  Japan ................. 369/275.4
57-20933  2/1982  Japan .
62-66444  3/1987  Japan ................. 369/275.1

OTHER PUBLICATIONS

Patent Abstracts of Japan, unexamined applications, P field, vol. 11, No. 26, Jan. 24, 1987 The Patent Office Japanese Government p. 48 P 539 *Kokai-No. 61-196 444 (Toshiba Corp.).
Patent Abstracts of Japan, unexamined applications, P field, vol. 11, No. 26, Jan. 24, 1987 The Patent Office Japanese Government p. 49 P 539 *Kokai-No. 61-196 445 (Toshiba Corp).*
Patent Abstracts of Japan, unexamined applications, P field, vol. 14, No. 207, Apr. 26, 1990 The Patent Office Japanese Government p. 6 P 1043 *Kokai-No. 2-44 544 (Matsushita Electric Ind. Co. Ltd.).

*Primary Examiner*—Hoa T. Nguyen
*Attorney, Agent, or Firm*—Oblon, Spivak, McClelland, Maier & Neustadt

[57] ABSTRACT

Disclosed herein is a read-only optical disk comprising an annulus transparent substrate of a synthetic resin having information pits thereon, a reflective layer comprising an Al alloy containing Ta and a protective layer provided thereover. The read-only optical disk according to the present invention is excellent in the corrosion resistance and has a high reliability.

2 Claims, 1 Drawing Sheet

READ-ONLY OPTICAL DISK CONTAINING A REFLECTIVE LAYER COMPRISING AN AL ALLOY CONTAINING TA

BACKGROUND OF THE INVENTION

The present invention relates to a read-only optical disk for conducting optical reading.

Read-only optical disks have generally been put to practical use as low cost and large capacity recording media.

A read-only optical disk generally comprises a transparent substrate having pits (minute recesses and protrusions) corresponding to recording signals formed on one of the surfaces thereof, on which a reflective layer (usually made of Al) is provided and a protective resin coating is applied further thereover.

However, the optical disk having this structure has a problem in view of corrosion resistance. For instance, peeling of the reflective layer caused by expansion and shrinkage of the substrate when undergoing abrupt change of temperature and humidity, corrosion of the reflective layer caused under high temperature and humidity, etc. directly lead to increased error rate, thereby greatly deteriorating the reliability of the optical disk.

In particular, if a disk is used in a special circumstance, such as under high temperature or low temperature, the problem of the corrosion resistance as described above becomes extremely significant.

In view of the foregoing problems, the present inventors have made an earnest study for providing a read-only optical disk having high corrosion resistance and, as a result, have found that a disk of excellent corrosion resistance can be obtained by selecting a specific structure. The present invention has been accomplished based on this finding.

SUMMARY OF THE INVENTION

The present invention relates to a read-only optical disk comprising an annulus transparent substrate of a synthetic resin on which information pits is formed, a reflective layer of an Al alloy containing Ta and a protective layer.

More in particular, the present invention relates to a read-only optical disk comprising an annulus transparent substrate of a synthetic resin having on one side information pits in an intermediate area between the outer peripheral margin and inner peripheral margin thereof, a reflective layer of an Al alloy containing Ta for covering the information pits part and a protective layer for covering the surface of the reflective layer and the outer peripheral margin and the inner peripheral margin of the substrate.

Figure 1:
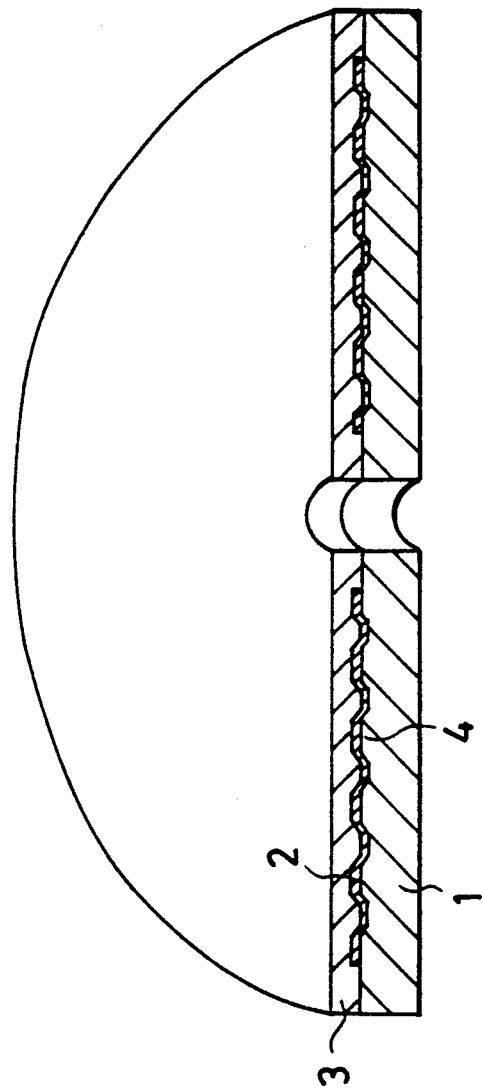
FIG. 1 shows a cross-sectional view of a read-only optical disk of the present invention.

Reference numeral 1 represents an annulus transparent substrate, reference numeral 2 represents a reflective layer, reference numeral 3 represents a protective layer and reference numeral 4 represents information pits.

DETAILED DESCRIPTION OF THE INVENTION

The substrate used in the present invention is transparent for transmitting the reproducing light and polycarbonate is preferably used as the material therefor.

The polycarbonate is usually molded into a substrate by means of a so-called injection molding wherein a resin in a molten state is injected into a molding die. In this instance, by using a die equipped therein with a stamper having information pits patern on the surface thereof, the information pits are formed on the surface of the substrate. In a case of a substrate with a diameter of 86 to 130 mm, the thickness of the substrate is usually 1.2 mm.

Excess residual strains in the polycarbonate substrate which may occur during injection molding is not desirable in view of optical properties and, accordingly, a polycarbonate having a weight average molecular weight of about 13,000 to 16,000 is preferably injection molded at a resin temperature of about 320° to 380° C.

Furthermore, for avoiding corrosion or degradation of the reflective layer provided on the polycarbonate substrate, residual amount of chlorine (halogen) as an impurity derived from starting materials contained in the polycarbonate is preferably not more than 20 ppm and, more preferably, not more than 5 ppm.

A polycarbonate is prepared by reacting a phenolic compound (bisphenol) and phosgene using a halogenated hydrocarbon as a solvent. If the chlorine compound or the halogenated hydrocarbon used in the reaction remains in the polycarbonate, they react with metal constituting the reflective layer to cause corrosion of the reflective layer.

For removing the halogenated hydrocarbon, it has been employed a method, for example, of adding a non-solvent to polycarbonate in a solution of polycarbonate prepared and gelling polycarbonate by spraying it into warmed water to remove the solvent.

The reflective layer for reflecting reproducing light is usually formed on the substrate, and an Al alloy containing Ta is used as the material for the reflective layer in the present invention. The Al alloy containing Ta has excellent corrosion resistance to ensure the high reliability of the optical disk as compared with a layer consisting of Al only. The content of Ta is preferably from 0.1 to 15 at % (atomic %) and, more preferably, from 0.5 to 10 at %. The thickness of the reflective layer is preferably from 0.03 to 1 μm and, more preferably, from 0.05 to 0.3 μm.

The reflective layer is not provided on the outer peripheral margin and the inner peripheral margin of the substrate but only at the intermediate area, in which information pits are formed, between both of the peripheral margins of the substrate. This selective formation of the reflective layer is carried out by covering the outer peripheral margin and the inner peripheral margin of the substrate by means of a suitable cover upon forming the reflective layer by means of sputtering or the like.

Also, it may be employed to apply a surface treatment to the substrate before forming the reflective layer, thereby improving the adhesion and aging stability of the reflective layer. As the method for the surface treatment, there may be mentioned a plasma treatment, UV-irradiation treatment, etc. It is sufficient to apply any of the treatments to such an extent as removing water adsorbed on the surface of the substrate or organic materials adhering to the surface of the substrate, which may cause corrosion or peeling of the reflective layer, that is, so-to-speak a water removing treatment.

The extent of the treatment may differ depending on the method of the treatment and, therefore can not be determined generally, but it is preferred that the surface of the substrate has a wettability by water of a contact angle of not greater than 60° in the case of the plasma treatment, and a wettability by water of a contact angle of not greater than 60° in the case of the UV-ray irradiation treatment.

Since the surface treatment to the substrate is applied for removing the water or organic materials which may adhere to the surface of the substrate after the molding of the substrate till the formation of the reflective layer, the treatment may be saved in a case where the formation of the reflective layer is made within 120 min, preferably, within 30 min after the molding of the substrate.

On the reflective layer, a protective layer is further provided. As the material for the protective layer there can be preferably used, for example, a so-called curable resin such as an energy ray-curable resin mainly comprising an epoxy acrylate or urethane acrylate and a heat-curable resin comprising a silicon resin. Among them, UV-curable resin is preferred.

Since the protective layers of such curable resins are usually coated directly on the reflective layer by a coating method such as spin coating and bar coating and then cured, it is necessary that they do not bring about corrosion or degradation of the Al-Ta reflective layer. Further, since the substrate and the protective layer are usually in direct contact with each other in the outer peripheral margin and the inner peripheral margin of the substrate on which reflective layer is not provided, it is also required for the protective layer that it has a good adhesion with the substrate, does not deteriorate the substrate, etc.

Therefore, it is preferred to use a curable resin with less content of compounds of alkali metal such as Na and K, compounds of alkaline earth metal such as Ca and compounds of halogen such as Cl, Br, F, etc., which may cause deterioration to the reflective layer. The content of the alkali metal or alkaline earth metal compound in the curable resin is not greater than 10 ppm, preferably, not greater than 5 ppm in terms of the alkali metal or alkaline earth metal, and the content of the halogen compound is not greater than 20 ppm and, preferably, not greater than 5 ppm in terms of the halogen.

The content of the alkali metal compound, the alkaline earth metal compound and the halogen compound can be reduced respectively within the above-mentioned range by sufficiently washing the curable resin with water, solvent, etc. or applying crystallization from a solvent.

The thickness of the protective layer after curing is preferably of about 1 to 20 μm. If the thickness is greater than 20 μm, the substrate may sometime be deformed due to the effect of the shrinkage of the protective layer, etc. and countermeasure therefore has to be taken. On the contrary if the thickness is less than 1 μm, durability is lowered.

It is preferred that the protective layer after curing has a pencil hardness of not less than HB and a shrinkage in the curing treatment of about from 0 to 15% in view of the protection against the external force, resistance to the deformation of the substrate, easy handlability, etc.

The present invention will now be explained more specifically referring to examples but it should be noted that the present invention is not restricted to the following examples unless it does not go beyond the scope of the invention.

Each of the following properties was measured according to the method below.

1. Content of alkali metal and alkaline earth metal

The measurement was carried out by atomic-absorption spectroscopy. The content was expressed in terms of metal content and not compound of the metal.

2. Content of halogen

A sample (30 mg) was oxidatively decomposed by being subjected to combustion in oxygen stream. The hydrogen halide thus produced was subjected to coulometric titration by using a silver electrode. The device employed was a chlorine.sulfur analizer TSX-10, Mitsubishi Kasei Corporation.

The content was expressed based on chlorine.

3. Contact angle

A face contact angle goniometer CA-S150 manufactured by Kyowa Kaimen Kagaku K. K. was used.

4. Shrinkage in curing treatment

The densities before and after curing was measured and the shrinkage was calculated by the following equation:

$$\frac{\rho_2 - \rho_1}{\rho_1} \times 100 (\%)$$

wherein $\rho_1$ is the density before curing and $\rho_2$ is the density after curing.

EXAMPLE 1

A polycarbonate having a weight average molecular weight of 15,000 and residual chlorine content of 5 ppm was injection molded at a resin temperature of 350° C. and under an injection pressure of 60 kg/cm$^2$ in a molding die having a stamper therein, to obtain a polycarbonate substrate of 130 mm diameter having tracking grooves and information pits. The resultant substrate was introduced into a sputtering device and, after evacuating the inside of the device to $8 \times 10^{-7}$ Torr or lower. After introducing Ar gas into the device, plasma treatment was applied to the substrate on the side of the information pits under the conditions of $5 \times 10^{-3}$ Torr, 100 W and 30 sec, to obtain a substrate having a wettability by water of a contact angle of 58°. Then, after evacuation to $8 \times 10^{-7}$ Torr or lower and subsequent introduction of Ar gas for adjusting the pressure to $3 \times 10^{-3}$ Torr, an alloy target having a composition of $Al_{97}Ta_3$ (at %) was DC sputtered with Ar gas on the substrate to form a reflective layer having a composition of $Al_{96}Ta_4$ (at %) and a thickness of 0.1 μm. The composition was analyzed by X-ray fluorometry.

The reflective layer was formed at an area ranging from 22 mm to 62 mm in the radial direction. The inner or outer periferal margins on which the reflective layer was not formed had a respective width of 14.5 mm and 3 mm.

A UV-ray curable epoxy acrylate resin containing 3 ppm of alkali metal and 5 ppm of halogen was spin-coated on the substrate provided with the reflective layer and cured under UV-irradiation to form a protective layer of 5 μm thickness. The protective layer after curing had a pencil hardness of H and a shrinkage of 8%.

The thus obtained disk was subjected to an acceleration test under the conditions of 70° C. and 90% RH for 1,000 hours and, when drop-in error rate was measured with lapse of time, the increase of error was kept at 1.6 times.

EXAMPLE 2

A disk was prepared in the same procedures as those in Example 1 except for applying a UV-ray irradiation treatment instead of the plasma treatment so as to obtain a substrate having a wettability by water of a contact angle of 45°.

When the acceleration test was conducted, the drop-in-error rate was kept at 1.4 times.

EXAMPLES 3 to 5

Disks were prepared in the same procedures as those in Example 1 except for forming reflective layers having compositions of $Al_{99}Ta_1$, $Al_{97.5}Ta_{2.5}$ and $Al_{95}Ta_5$ by placing Ta or Al chips on a target of $Al_{97}Ta_3$ (at %).

When acceleration test was applied, the drop-in error rates were kept at 1.7, 1.4 and 1.2 times.

COMPARATIVE EXAMPLE 1

A disk was prepared in the same procedures as those in Example 1 except for forming on a substrate a reflective layer consisting of Al only. The thickness of the reflective layer was 0.1 μm. When the disk was applied with an acceleration test in the same manner as in Example 1, the error rate could not be measured due to corrosion over the entire surface.

What is claimed is:

1. A read-only optical disk comprising an annulus transparent substrate comprising a polycarbonate having a weight average molecular weight of from 13,000 to 16,000 and chlorine remaining as an impurity in the polycarbonate of 0 to 20 ppm, which on one side has optically readable information pits, a reflective layer comprising an Al alloy containing from 0.1 to 15 at % of Ta on the substrate and protective layer on the reflective layer, wherein the reflective layer is provided on an intermediate area on which the information pits are formed between the outer peripheral margin and inner peripheral margin of the annulus substrate, and the protective layer is provided so as to protect the surface of the reflective layer, the outer peripheral margin and the inner peripheral margin of the substrate, and the protective layer comprises a curable resin having a content of a residual metal compound of 0 to 10 ppm in terms of the a residual halogen compound of 0 to 20 ppm in terms of the halogen, the metal compound being at least one compound selected from the group consisting of alkali metal compounds and alkaline earth metal compounds, and a surface of the transparent substrate has a wettability by water of a contact angle of 0° to 60°, and a pencil hardness of the protective layer is HB or more.

2. A read-only optical disk according to claim 1, wherein the protective layered is cured and a shrinkage of the protective layer in the curing treatment is from 0 to 15%.

* * * * *